O. A. GIFFEN.
GAS CUT-OFF VALVE.
APPLICATION FILED JUNE 11, 1909.

954,180.

Patented Apr. 5, 1910.
2 SHEETS—SHEET 1.

Witnesses
J. C. Simpson
C. N. Woodward

Inventor
Otto A. Giffen.
By Chandler & Chandler
Attorneys

O. A. GIFFEN.
GAS CUT-OFF VALVE.
APPLICATION FILED JUNE 11, 1909.
954,180.
Patented Apr. 5, 1910.
2 SHEETS—SHEET 2.
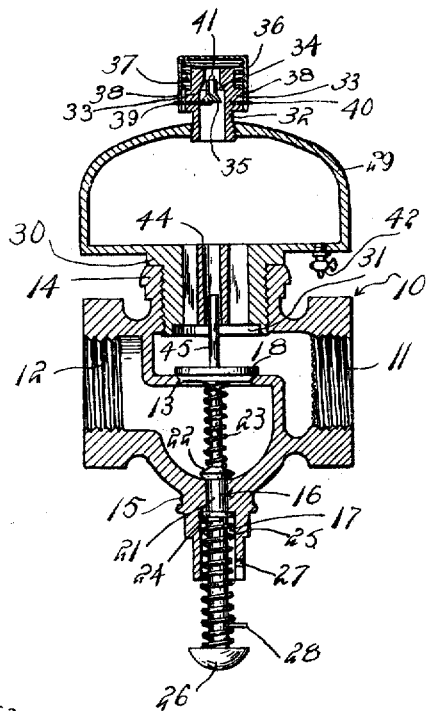
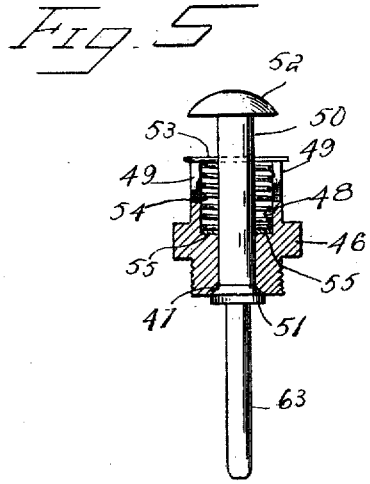
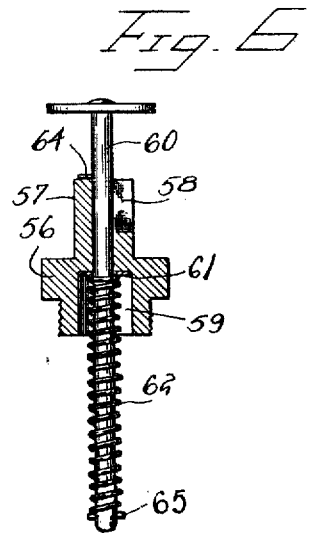
Witnesses
J. C. Simpson
C. N. Woodward
Inventor
Otto A. Giffen.
By Chandler & Chandler
Attorneys

UNITED STATES PATENT OFFICE.

OTTO A. GIFFEN, OF SAN GABRIEL, CALIFORNIA.

GAS-CUT-OFF VALVE.

954,180.  Specification of Letters Patent.  Patented Apr. 5, 1910.

Application filed June 11, 1909. Serial No. 501,581.

*To all whom it may concern:*

Be it known that I, OTTO A. GIFFEN, a citizen of the United States, residing at San Gabriel, in the county of Los Angeles, State of California, have invented certain new and useful Improvements in Gas-Cut-Off Valves; and I do hereby declare the following to be a full, clear, and exact description of the invention, such as will enable others skilled in the art to which it appertains to make and use the same.

This invention relates to gas cut off valves, and has for one of its objects to improve the construction and increase the efficiency and utility of devices of this character.

The improved device has reference more particularly to cut off valves for gas supply systems, and aims generally to automatically shut off the supply of gas from the burners in event of the pressure becoming too low to support combustion in the burners, and to remain in its closed position after the pressure returns until manually opened.

In the improved device provision is also made for causing a supplemental valve to be closed automatically by the pressure of the gas escaping from the inlet chamber of the main valve when the pressure of gas rises suddenly after having fallen sufficiently to permit the closure of the main valve.

Figure 1:
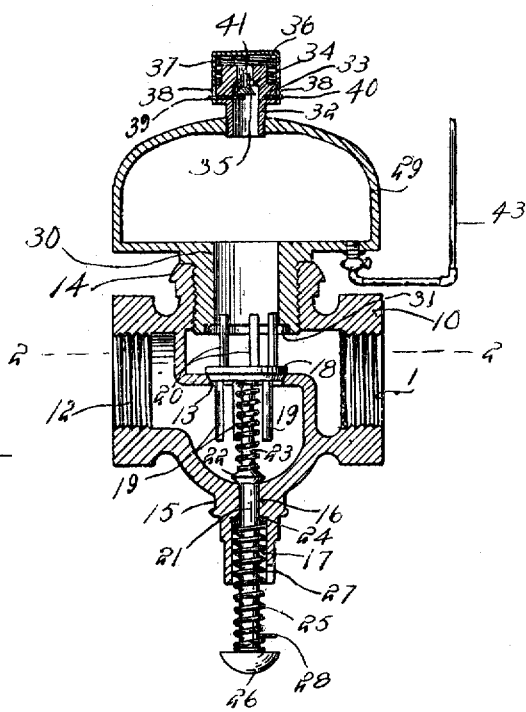
Figure 2:
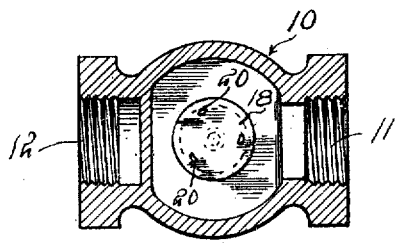
Figure 3:
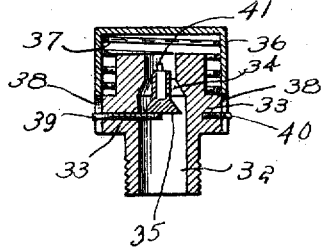

The invention consists in certain novel features of construction as hereafter explained and then specifically pointed out in the claims, and in the drawings illustrative of the preferred embodiment of the invention, Figure 1 is a vertical section of the improved device. Fig. 2 is a section on the line 2—2 of Fig. 1. Fig. 3 is an enlarged sectional detail of the escape valve. Fig. 4 is a sectional view similar to Fig. 1 illustrating a modification in the construction. Figs. 5 and 6 are sectional detail views illustrating other modifications in the construction.

The improved device in its simpler form comprises a casing or body 10 having a threaded intake 11 at one end and a threaded discharge 12 at the other end and with an intermediate valve seat 13 providing means of communication between the intake 11 and the discharge 12. Extending from the upper portion of the casing 10 is an internally threaded projection 14, while a hub 15 depends from the lower side, the hub having a longitudinal bore indicated at 16 and counterbored at 17. The valve 18 is mounted upon the seat 13, the valve having downwardly projecting guide bearings 19 and upwardly extending guide bars 20, the object to be hereafter explained.

Mounted for movement through the bore 16 of the hub 15 is a stem 21 having a lateral shoulder 22 intermediate its ends, and with a spring 23 surrounding the stem above the shoulder. The stem terminates short of the lower face of the valve 18, while the spring 23 bears by one end beneath the valve and at the other end upon the shoulder 22. By this means the stem is maintained yieldably in its downward position, and the spring exerts its force against the pressure above the valve, as shown.

Arranged within the counterbore 17 of the hub 15 is a bushing 24, and surrounding the stem 21 within the counterbore and bearing beneath the bushing is a spring 25. The lower terminal of the stem is provided with a head 26 against which the spring 25 bears. By this means the spring 25 operates to maintain the stem yieldably in its downward position, the downward movement being limited by the enlargement 22.

Formed in the lower portion of the hub 15 is a bayonet joint slot 27 opening downwardly, and inserted into the stem 21 is a lateral pin 28, adapted to be engaged in the slot 27 when the stem is forced upwardly by pressure applied to its head 26 and then rotated slightly to cause the pin to enter the lateral portion of the slot. By this means the stem may be elevated and locked in fixed position relative to the hub, and thus maintain the valve 18 positively in open position when required, as hereafter explained.

A relatively large closed chamber 29 forms a part of the improved device, and is provided with a depending annular hub 30 externally threaded and engaging in the internally threaded portion 14 of the casing. The lower end of the annular portion 30 is provided with a seat 31 against which the upper surface of the valve 18 rests when in elevated position, the valve 18 being double-acting and adapted to be engaged alternately with the seats 13 or 31, as hereafter explained. The upper guide members 20 extend into the bore of the member 30, as shown in Fig. 1, and serve to maintain the valve in position, and prevent lateral movement thereof, as will be obvious. The two sets of the guide members 19—20 thus maintain the valve in position relative to its seats at all portions of its stroke.

Formed in the upper side of the chamber 29 is a threaded aperture through which an annular block 32 is inserted, the block having a lateral flange 33 at its upper end and with an internal valve seat 34. A valve 35 is disposed within the member 32 and engages the seat 34 when in one position. Fitting over the flange portion 33 of the hub 32 is a cap 36, and arranged between the cap 36 and the flange 33 is a spring 37, operating to maintain the cap yieldably in its upward position. Formed in the opposite sides of the cap 36 are vertical slots 38, and inserted into the body 32 are pins 39-40 operating to couple the cap 36 to the body 32, while at the same time permitting the vertical movement thereof within the range of the slots. The pin 39 extends at its inner end into the bore of the body 32 and forms a stop to prevent the displacement of the valve 35, the pin 39 being located at a sufficient distance below the valve to permit the requisite movement thereof. The flange 33 is located at a short distance below the upper end of the body 32, and the spring 37 bears upon this flange, as before stated, and the valve 35 is provided with a stud 41 extending above the upper end of the member 32 when the valve is closed, so that when the valve is in closed position the depression of the cap 36 will engage the valve and open it against the pressure within the chamber 29. By this means the valve 36 may be opened when required, by simply pressing upon the cap 36, as will be obvious. The cap 36 serves the twofold purpose of a means for manually opening the valve 35 when required, and also as a protection to the valve to prevent the entrance of foreign matter into the chamber 29. A pet-cock 42 is connected into the chamber 29 to provide suitable drainage, and when the valve is located within a building where the escape of gas would be objectionable, a small discharge pipe 43 will be connected to the pet-cock and conducted to the outer air. When the valve is located in the open air, as may frequently occur, the pipe will not be required, as will be obvious. The valve 35 operates as a supplementary valve, which cuts off the escape of the gas after the main valve 18 has been closed and the pressure restored.

In Fig. 4 is shown a slight modification in the manner of guiding the main valve 18, which consists in arranging a tubular guide stem 44 within the bore of the hub 30, and providing the valve 18 with a single central guide stem 45 fitting into the bore of the stud 44. This arrangement will be employed under some circumstances in place of the guide members 19—20.

In Fig. 5 is shown a modification in the manner of constructing the supplemental valve and consists in a hub 46 similar to the hub 32, and provided with an internal bore and a valve seat 47 and with the upper portion counterbored as shown at 48 and with longitudinal slots 49 in the counterbored portion. Extending through the hub 46 is a stem 50 having an integral valve 51 thereon, engaging the valve seat 47, and with an extension 63 adapted to engage the valve 18, as hereafter explained. The stem 50 extends above the hub 46 and terminates in a push button 52 and is provided with a transverse pin 53 bearing upon the upper edge of the counterbored portion 48 of the hub 46 and adapted to enter the slots 49 when the stem is disposed in one position, and thus permit the valve 51 to be unseated. A spring 54 is located within the counterbore of the hub 46 and bears at its lower end upon a bushing 55 within the counter-bore 48 and bearing at its upper end beneath the pin 53. By this means the spring operates to maintain the stem 50 and its valve 51 yieldably in their upward position, and by rotating the stem 50 until the pin 53 is opposite the solid or unslotted portion of the hub 46, the valve will be maintained rigidly in seated position. But when the stem is opposite the slots 49, the stem can then be depressed to forcibly unseat the valve 51, and also unseat the valve 18 from the seat 31, as hereafter explained.

In Fig. 6 is shown another modification in the manner of constructing the supplemental valve consisting in providing a body 56 threaded to enter the aperture in the chamber 29, and serving the same purpose as the hub 32 shown in Fig. 1. The hub 56 is provided with an upwardly extending portion 57 having a central longitudinal slot 58 at one side and counterbored in its lower portion as shown at 59. A stem 60 is slidably disposed through the bore of the member 56 and is provided with a stop pin 64 above the projection 57. A bushing 61 is located within the counterbore 59, and a spring 62 surrounds the stem 60 and bears at one end upon a pin 65, and thus holds the stem 60 in yieldable engagement with the valve 18 and at the other end the spring bars beneath the bushing 61. By this means the valve 18 is free to be moved vertically between the pressure exerted by the springs 23 and 62 and at the same time the valve may be unseated from the seat 31 by depressing the stem 60, as above described. This action opens the valve 18.

In the improved structure shown in Figs. 5 and 6 the lower portion of the stems do not reach the valve 18 when the latter is on its lower seat 13, but are operative upon the valve when the latter is engaged with its upper seat 31. To close the cut off the stem 60 is turned until the pin 64 enters the slot 58, which permits the spring to move the stem 60 downwardly a distance equal to the range of the slot 58, when the force of the spring 62 is utilized to maintain the valve 18 yieldably upon its lower seat 13. By this arrangement a relatively light valve can be used when necessary, as the construction precludes the chances for breaking or twisting the valves.

In the operation of the improved device the normal pressure beneath the main valve will hold the latter in its raised or open position, the gas being thus free to pass through the opening of the seat 13 and thence to the discharge 12 which is connected to the supply pipe for the burners, until the pressure decreases sufficiently to permit the valve to fall by its own weight upon the seat 13, thus cutting off the further supply. If the supply is to be continuous, the stem 21 is locked in its upward position by engaging the pin 28 with the bayonet slot 27 and thus locking the valve 18 in its open position and engaged with its seat 31.

Suitable packings will be located between the bushings 24, 55 and 61 and the valve casings with which they are associated.

The improved device is simple in construction, can be inexpensively manufactured, as each of the seats and other parts are within reach of machine operated implements, and very little if any hand work is required. The parts are readily separable for inspection or repairs.

What is claimed is:—

1. In a device of the class described a casing provided with an internal valve seat, a supplemental chamber communicating with the casing, and with a valve seat between the chamber and the casing, a double-acting valve movable between said valve seats and adapted to be alternately engaged therewith, a stem movable through said casing, a resilient member between said stem and valve, said stem operating to transfer said valve from the internal valve seat to the chamber valve seat, and means for locking said stem in its upper position.

2. In a device of the class described a casing provided with an internal valve seat, a supplemental chamber communicating with the casing and with a valve seat between the chamber and the casing, a double-acting valve movable between said valve seats and adapted to be alternately engaged therewith, means for moving said double-acting valve from one of said seats to the other, a supplemental valve in said chamber, means for simultaneously opening said supplemental valve and unseating said double-acting valve from the chamber seat.

3. In a device of the class described a casing provided with an internal valve seat, a supplemental chamber communicating with the casing and with a valve seat between the chamber and the casing, a double-acting valve movable between said valve seats and adapted to be alternately engaged therewith, means for moving said double-acting valve from one of said seats to the other, a supplemental valve in said chamber, a protecting cap movably supported over said supplemental valve, and means whereby the compression of said cap opens said supplemental valve.

4. In a device of the class described a casing provided with an intake and a discharge compartment, a supplemental chamber communicating with the inlet compartment, a double-acting valve operating between said intake and discharge compartment and between said intake compartment and supplemental chamber, a supplemental valve in the supplemental chamber, a stem movable in said casing and operating to open said double-acting valve and open communication between said intake and discharge compartments and to close communication between said intake compartment and said supplemental chamber, and means for locking said stem in position.

In testimony whereof, I affix my signature, in presence of two witnesses.

OTTO A. GIFFEN.

Witnesses:
J. E. GUTHRIE,
ARTHUR ORWIG.